cated by line 2—2 of FIG. 1; and

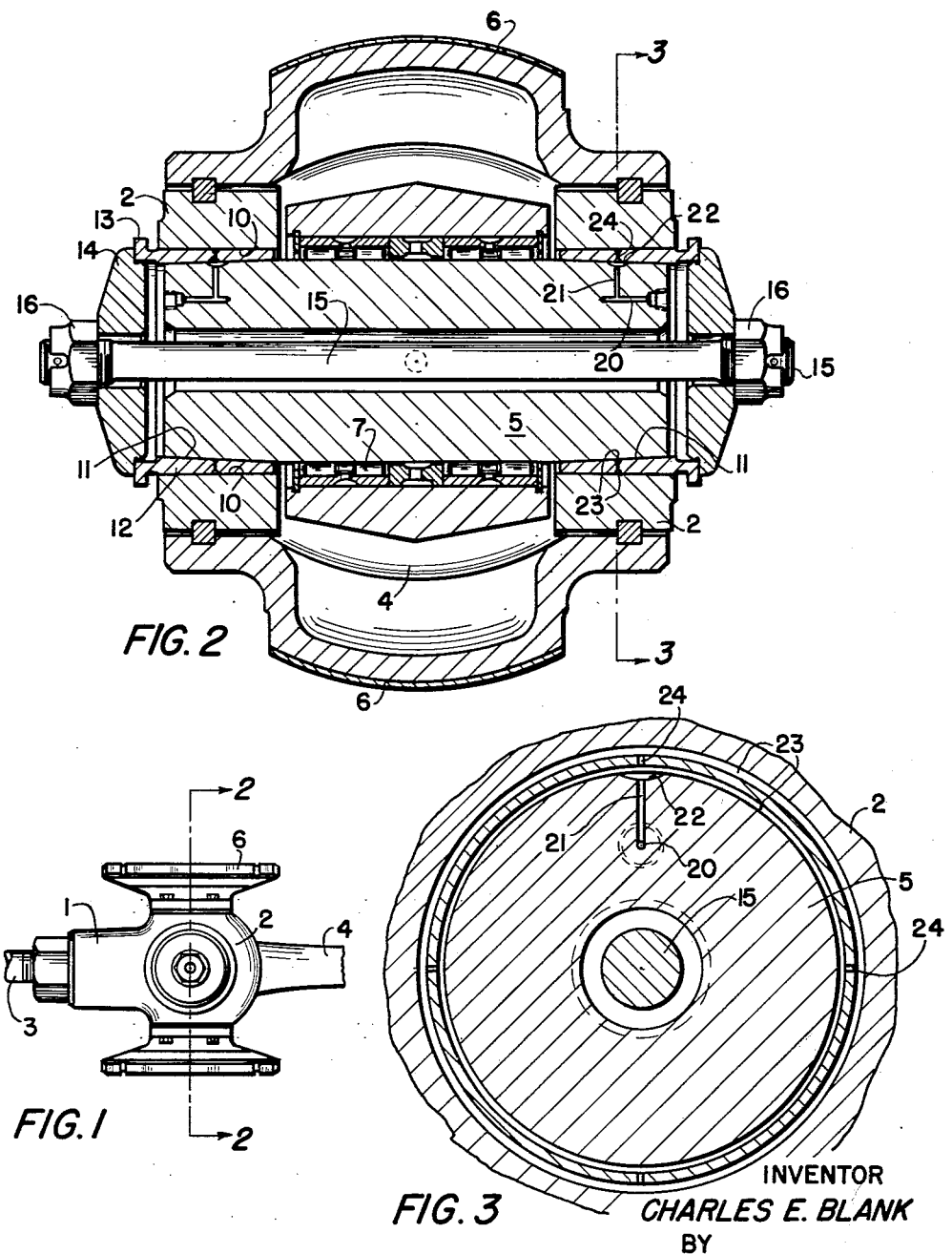

United States Patent Office 3,129,966
Patented Apr. 21, 1964

3,129,966
CROSSHEAD WRIST PIN ASSEMBLY
Charles E. Blank, Painted Post, N.Y., assignor to Ingersoll-Rand Company, New York, N.Y., a corporation of New Jersey
Filed Oct. 9, 1961, Ser. No. 143,816
3 Claims. (Cl. 287—100)

This invention relates to a wrist pin construction for a crosshead of the type used in reciprocating machinery such as internal combustion engines, compressors and pumps.

It is conventional in a crosshead to provide a bifurcated crosshead body formed by a pair of spaced branch legs interconnected by a bight and to pivot the end of a connecting rod between the spaced branch legs of the crosshead by a wrist pin which is tapered in one axial direction and received in correspondingly tapered and axially aligned bores formed in the spaced branch legs of the crosshead body. This construction is objectionable because slight errors or variations made in boring the tapered bores in the crosshead branch legs and grinding the taper on the wrist pin prevent the wrist pin from fitting properly and tightly in the crosshead bores. Usually, small errors of this nature necessitate the performance of considerable laborious and expensive hand labor on the tapered joints between the bore walls and the wrist pin before both ends of the wrist pin fit tightly and properly in the crosshead.

The principal object of this invention is to provide a wrist pin construction for a crosshead which is easier and less laborious to assemble properly in the crosshead and to provide one in which slight variations or errors made in boring and grinding the interfitting tapered surfaces are less likely to prevent the wrist pin from fitting properly and tightly at both ends in the bores in the crosshead body.

Other important objects of this invention are: to provide a wrist pin construction which permits the crosshead bores receiving the wrist pin to be cylindrical non-tapered bores; to provide a wrist pin construction which can be easily and readily assembled so that the wrist pin is equally loaded or stressed at both ends in the opposite bores of the crosshead; to provide a wrist pin having a pair of relatively short tapered portions which are independently tapered relative to each other so that errors made in forming the taper angle are less critical to the proper fitting of the wrist pin in the crosshead bores; and to provide a crosshead wrist pin assembly which is relatively less expensive to manufacture and assemble and less likely to cause trouble in its assembly.

These objects are obtained broadly by boring cylindrical non-tapered axially aligned bores in the branch legs of the bifurcated crosshead body, mounting in the crosshead a wrist pin having its opposite end portions tapered outwardly opposite to each other and loosely received in the opposed crosshead bores, fitting a pair of sleeves in the crosshead bores over the tapered end portions of the wrist pin, each sleeve having a cylindrical non-tapered exterior circumference sized to fit tightly in the adjacent crosshead bore and being tapered on its interior to correspond to and interfit with the adjacent end portion of the wrist pin, and by providing means for pulling the pair of sleeves inwardly on the wrist pin toward each other to cause the tapered end portions of the wrist pin to cooperate with the tapered interiors of the sleeves in expanding the sleeves in the crosshead bores and locking the wrist pin tightly in the crosshead.

This invention is described in connection with the accompanying drawing wherein:

FIG. 1 is a vertical elevation of a crosshead embodiment constructed in accordance with the concepts of this invention;

FIG. 2 is an enlarged vertical section of the crosshead taken along the axis of the crosshead wrist pin, as indicated by line 2—2 of FIG. 1; and FIG. 3 is a fragmentary enlarged section taken at right angles to the wrist pin along line 3—3 of FIG. 2.

The crosshead assembly shown in the drawing is conventional in its outward appearance and generally includes a bifurcated crosshead body 1 composed of a pair of spaced branch legs 2 interconnected by a bight, also designated 1, an end of a piston rod 3 fixed to the bight 1, an end of a connecting rod 4 pivoted between the crosshead branch legs 2 on a wrist pin 5 fixed to the branch legs 2, and a pair of slides 6 mounted on the bottom and top of the crosshead body 1 to slide in conventional guides (not shown) for holding the crosshead in a straight reciprocating travel path.

All of the above structure is conventional crosshead structure commonly found in crossheads used to interconnect the reciprocating pistons of compressors, engines and pumps to a rotating crank.

It will be understood that both end portions of the wrist pin 5 should be tightly fixed in the crosshead branch legs 2 and that the connecting rod 4 is rotatively mounted by conventional bearing structure, shown in the drawing as roller bearing 7, on the central portion of the wrist pin 5 located between the branch legs 2 of the crosshead body 1. My invention lies in the means used to connect or mount the end portions of the wrist pin 5 in the branch legs 2 of the crosshead body 1.

In accordance with my invention, the branch legs 2 of the crosshead body 1 are provided with a pair of axially aligned cylindrical non-tapering bores 10. The cylindrical bores 10 can be formed in the crosshead branch legs 2 more easily without errors occurring than it is possible when forming tapered bores, such as are provided in prior art conventional crossheads.

The wrist pin end portions 11 which extend through the bores 10 are tapered in opposite directions to each other and at angles converging outward from the ends of the wrist pin 5. Each of the end portions 11 may be ground to different taper angles, although, preferably, they are ground to the same angles. As can be seen in FIG. 2, these taper angles are normally relatively small. For example, a suitable taper may be one inch in one foot.

A sleeve 12 fits in each bore 10 between the walls of the bore and the adjacent circumference of the tapered end portion 11 of the wrist pin 5. The sleeve 12 has an exterior periphery which is cylindrical and is sized to fit snugly in the bore 10. The interior of the sleeve 12 is tapered to correspond with and interfit on the tapered end portion 11 of the wrist pin 5. The sleeve 12 is arranged to fit in the bore 10 and on the wrist pin end portion 11 with its outer end protruding outwardly beyond the outside of the adjacent crosshead branch leg 2. An outwardly flared annular flange 13 is formed on the outer end of the sleeve 12 for serving as an abutment surface to engage means pinching the pair of sleeves 12 inwardly toward each other on the wrist pin 5.

Since the lengths of the tapered end portions 11 of the wrist pin 5 and the tapered interiors of the sleeves 12 are relatively short, slight errors made in forming the tapers are less likely to prevent the tapered surfaces from properly and tightly engaging each other. Furthermore, since the tapered engaging surfaces on the opposite branch legs 2 of the crosshead body 1 are relatively independent of each other, any error made in forming one end of the pin does not produce the same error in the taper on the other end of the wrist pin.

The means for pinching the sleeves 12 together on the wrist pin 5 includes a pair of centrally apertured end caps or washers 14, each of which fits over and seats on the outer end of one of the sleeves 12, and a threaded member, shown in the drawing as a pin 15, for drawing the end caps 14 toward each other. The threaded pin 15 is threaded on both ends and is mounted to extend through the hollow center of the wrist pin 5 with its threaded end portions extending through the apertured end caps 14 and carrying cooperating nuts 16 for pinching or drawing the end caps 14 and sleeves 12 toward each other.

The pinching together of the end caps 14 causes the tapered engaging surfaces of the sleeves 12 and the wrist pin end portions 11 to wedge and expand the sleeve walls outwardly against the walls of the crosshead bores 10, to effectively lock the wrist pin 5 in the crosshead branch arms 2. It will be understood that the means shown in the drawing for pinching the sleeves 12 toward each other may take other forms. For example, the wrist pin 5 might be threaded on its ends and carry nuts for drawing the end caps 14 together.

After the crosshead structure is assembled and the wrist pin 5 is tightly seated in place in the sleeves 12 and the crosshead bores 10, normally it is quite difficult to disassemble the crosshead due to the tight fit of the wrist pin 5. Hence, means is provided to introduce hydraulic pressure in the interfaces located between the sleeve 12, the wrist pin end portion 11 and the bore wall 10. This means is shown in FIGS. 2 and 3 as a short longitudinal passage 20 drilled into each end of the wrist pin 5 and having an inlet formed for being releasably connected with a hydraulic pressure source, not shown, a radial passage 21 extending radially outward from each passage 20 to terminate in a short longitudinal slot 22, and a pair of annular grooves 23 formed on the exterior and interior of the sleeve 12 and placed in communication with each other by several angularly spaced radial holes 24, the grooves 23 being positioned on the sleeve 12 so that they are in communication with the longitudinal slot 22 when the crosshead structure is assembled. It will be understood that the hydraulic introduction system of passages, slots, grooves and holes is duplicated at both ends of the wrist pin.

While in accordance with the patent statutes a preferred embodiment of the present invention has been illustrated and described in detail, it is to be particularly understood that the invention is not limited thereto or thereby.

Having described my invention, I claim:

1. A crosshead assembly comprising: a bifurcated crosshead body having a pair of spaced branch legs interconnected by a bight and adapted to be connected to a piston rod, said branch legs containing a pair of axially aligned cylindrical crosshead bores; a connecting rod having an end portion located between said branch legs and containing an opening which is axially aligned with the crosshead bores; a hollow wrist pin extending through the aligned crosshead bores and the opening in the connecting rod and being rotatively mounted in said opening in said connecting rod, the outer portions of said wrist pin which extend through said crosshead bores being tapered in opposite directions to each other and at angles converging outwardly away from the ends of the wrist pin; a sleeve having a cylindrical non-tapered outer periphery snugly fitting in each crosshead bore and having an internally tapered interior periphery receiving and interfitting with the adjacent tapered outer portion of said wrist pin; and means to move each sleeve inward toward the other sleeve and relative to said wrist pin to wedge and lock the sleeves on said wrist pin and in said crosshead bores.

2. The crosshead assembly of claim 1 wherein said means for moving said sleeves inward toward each other includes a threaded pin extending axially through said wrist pin and having abutment means on its opposite ends for engaging the outer ends of the sleeves, said abutment means on at least one end of said pin being threaded thereon for adjustably forcing said sleeves toward each other.

3. The crosshead assembly of claim 2 wherein said wrist pin has a cylindrical intermediate portion extending between and joining its outer tapered portions with the diameter of said intermediate portion being equal to the maximum diameters of the outer tapered portions.

References Cited in the file of this patent

UNITED STATES PATENTS

| | | |
|---|---|---|
| 321,727 | Ide | July 7, 1885 |
| 490,876 | Kirsch-King | Jan. 31, 1893 |
| 626,707 | Livingston | June 13, 1899 |
| 987,853 | Bryan | Mar. 28, 1911 |
| 1,231,745 | Kenny | July 3, 1917 |
| 1,251,965 | Coatalen | Jan. 1, 1918 |
| 2,043,014 | Shoemaker | June 2, 1936 |
| 2,764,437 | Bratt | Sept. 25, 1956 |
| 2,840,399 | Harless et al. | June 24, 1958 |
| 2,899,222 | Ross | Aug. 11, 1959 |